H. G. MORRIS.

Assignor to H. MORRIS.

GAS-RETORT LID-FASTENING.

No. 7,456. Reissued Jan. 2, 1877.

Witnesses:
L. S. Smisbaugh.
F. E. Tipton.

Inventor:
Henry G. Morris.
by J. Snowden Bell
Atty.

N. PETERS, PHOTO-LITHOGRAPHER, WASHINGTON, D. C.

UNITED STATES PATENT OFFICE.

HENRY G. MORRIS, OF PHILADELPHIA, PENNSYLVANIA, ASSIGNOR TO HENRY MORRIS.

IMPROVEMENT IN GAS-RETORT-LID FASTENINGS.

Specification forming part of Letters Patent No. 178,320, dated June 6, 1876; reissue No. 7,456, dated January 2, 1877; application filed September 14, 1876.

*To all whom it may concern:*

Be it known that I, HENRY G. MORRIS, of the city and county of Philadelphia, in the State of Pennsylvania, have invented a certain new and useful Improvement in Fastenings for Lids of Gas-Retorts, &c., of which the following is a specification:

The object of my invention is to provide such means for fastening the lids of gas-retorts, or other covers, as will enable the lids to be opened either from the right or left hand side at pleasure, by changing the relative positions of the several parts; to which end my improvement consists in a reversible cross-bar of peculiar construction, combined with a pivoted hinge-piece and catch, eccentric pins, and a reversible clamping-lever, as hereinafter more fully set forth.

Figure 1:
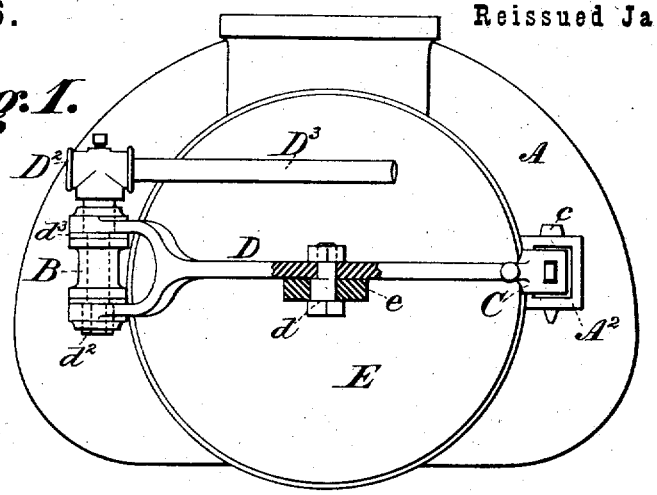
Figure 2:
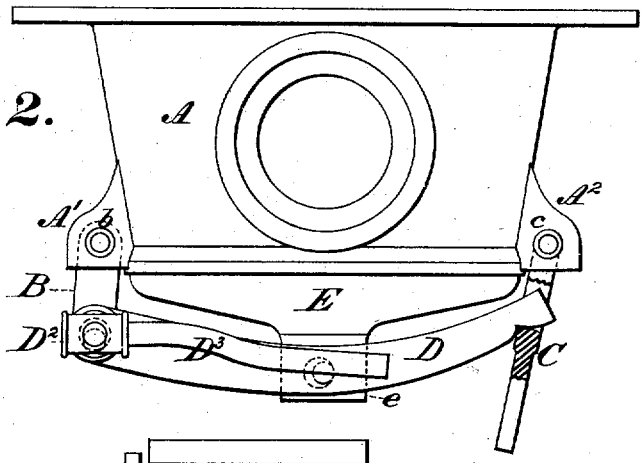
Figure 3:
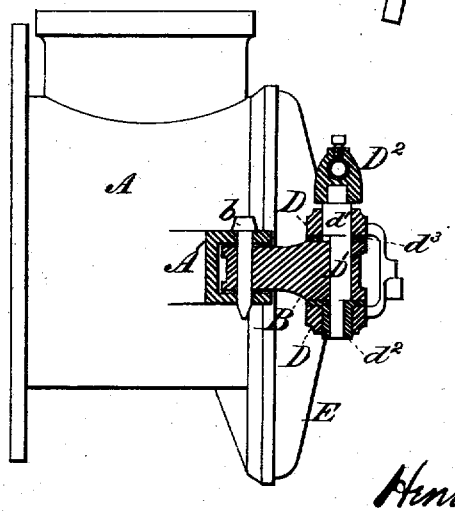

In the accompanying drawings, Figure 1 is a front view, partly in section, of my improvement applied to a retort mouth-piece and lid; Fig. 2, a plan or top view; and Fig. 3, a side view, partly in section, of the same.

To carry out my invention, I provide the retort mouth-piece A with two similarly-formed lugs or pockets, $A^1$ $A^2$, one on each side, to which lugs are pivoted by the pins *b* and *c*, respectively, a hinge-piece, B, and a swinging catch, C. A cross-bar, D, is connected to a lug, *e*, on the lid or cover E, by an eccentric pin, *d*, one of its ends being forked, and pivoted to the hinge-piece B by a pin, $D^1$, upon which is formed an eccentric, $d^1$, at that portion of the pin which passes through the upper arm of the forked end of the cross-bar, the lower arm being bored out to a corresponding diameter, and a flanged bushing, $d^2$, interposed between the body of the pin and the arm.

The two arms are of similar form, and equally distant from the longitudinal center line of the cross-bar. A washer, $d^3$, equal in thickness to the flange of the bushing, is placed between the hinge-piece and upper arm. A curved face is formed upon the free end of the cross-bar D, to bear against the end of a longitudinal slot in the catch C. A T-head, $D^2$, is secured upon the upper end of the pin $D^1$, and carries a clamping-lever, $D^3$, preferably formed of wrought-iron tube, and curved outwardly conformably with the lid.

In the operation of the device, after applying the lid to the face of the mouth-piece, the lever $D^3$ is moved into a position substantially at right angles to the face, in which position the eccentric on the pin $D^1$ will throw out the forked end of the lever from the face, and the opposite end will be moved correspondingly toward the face, so that the catch C may be swung over the end of the cross-bar.

By the rotation of the pin $D^1$ for a quarter of a revolution the lid will be pressed up firmly to the face of the mouth-piece, the cross-bar acting as a lever, of which the catch C is the fulcrum.

The relative positions of the hinge-piece B and catch C can be changed at pleasure, when it is desired to cause the lid to open from the opposite side, by a reversal of the cross-bar, the change of position of the flanged bushing $d^2$ enabling the lower arm of the cross-bar, which, in the position shown in the drawings, receives the body of the pin $D^1$, to admit the eccentric $d^1$ when the bar is turned over.

I am aware that a retort-lid connected to a cross-bar hinged to the mouth-piece, and operated by an eccentric pin, has been heretofore known, one form of such device being shown in the Letters Patent of Stephen Holman, No. 117,631, dated August 1, 1871, and I do not, therefore, broadly claim such construction.

I claim as my invention, and desire to secure by Letters Patent—

1. The combination of a fork-ended cross-bar, a pin provided with a clamping-lever and an eccentric, and a flanged bushing for the eccentric pin, substantially as set forth.

2. The combination of a retort mouth-piece, a hinge-piece, and a swinging catch, respectively pivoted thereto, a cross-bar pivoted to the retort-cover, and an eccentric pin and clamping-lever connecting the cover and hinge-piece, substantially as set forth.

HENRY G. MORRIS.

Witnesses:
J. SNOWDEN BELL,
D. L. COLLIER.